United States Patent
Lei et al.

(10) Patent No.: US 10,885,256 B1
(45) Date of Patent: Jan. 5, 2021

(54) METHOD AND SYSTEM FOR INTEGRATED CIRCUIT (IC) LAYOUT MIGRATION INTEGRATED WITH LAYOUT EXPERTISE

(71) Applicant: Hong Kong Applied Science and Technology Research Institute Company, Limited, Hong Kong (HK)

(72) Inventors: Yuan Lei, Shenzhen (CN); Chenyue Ma, Hong Kong (HK)

(73) Assignee: Hong Kong Applied Science and Technology Research Institute Company, Limited

( * ) Notice: Subject to any disclaimer, the term of this patent is extended or adjusted under 35 U.S.C. 154(b) by 0 days.

(21) Appl. No.: 16/781,110

(22) Filed: Feb. 4, 2020

(51) Int. Cl.
G06F 30/392 (2020.01)
G06F 30/398 (2020.01)
G06F 30/31 (2020.01)

(52) U.S. Cl.
CPC .......... G06F 30/392 (2020.01); G06F 30/31 (2020.01); G06F 30/398 (2020.01)

(58) Field of Classification Search
CPC ...... G06F 30/392; G06F 30/31; G06F 30/398; G06F 30/36; G06F 30/394
See application file for complete search history.

(56) References Cited

U.S. PATENT DOCUMENTS

| 7,409,651 | B2 | 8/2008 | Berger et al. | |
| 7,506,277 | B1 * | 3/2009 | Arora | G06F 30/398 716/122 |
| 7,543,262 | B2 | 6/2009 | Wang et al. | |
| 7,665,054 | B1 * | 2/2010 | Gopalakrishnan | G06F 30/392 716/122 |
| 7,783,995 | B2 * | 8/2010 | Joshi | G06F 30/39 716/103 |
| 8,347,255 | B2 * | 1/2013 | Agarwal | G06F 30/39 716/122 |
| 8,423,941 | B2 * | 4/2013 | Heng | G06F 30/39 716/118 |

(Continued)

FOREIGN PATENT DOCUMENTS

| CN | 102110182 A | 6/2011 |
| CN | 109271677 A | 1/2019 |

OTHER PUBLICATIONS

ISR and Written Opinion, PCT/CN2020/075627, dated Nov. 6, 2020.

*Primary Examiner* — Nha T Nguyen
(74) *Attorney, Agent, or Firm* — Stuart T. Auvinen; gPatent LLC

(57) ABSTRACT

An existing layout of an Integrated Circuit (IC) is migrated to two or more target layouts for different semiconductor processes with different design rules. The existing layout file is parsed for data items such as boundaries, paths, text, and cell instances to generate a layout database file with a text format. A layout engineer selects functions from a layout design toolkit and writes reusable code with these functions. Placement functions can specify relative locations to other data items that are dependent on the design rules. Routing functions allow interconnect to be re-routed after placements are adjusted for various target design rules. An analog layout expertise integrator replaces some of the data items in the layout database file with the reusable code to generate a reusable layout database. A layout generator compiles the reusable layout database and converts it to multiple target layouts for multiple design rules.

20 Claims, 14 Drawing Sheets

(56) References Cited

U.S. PATENT DOCUMENTS

| | | | | |
|---|---|---|---|---|
| 8,607,182 B2* | 12/2013 | Chen | ................. | G06F 30/392 |
| | | | | 716/119 |
| 8,707,226 B2* | 4/2014 | Lu | ................. | G06F 30/39 |
| | | | | 716/104 |
| 8,745,554 B2* | 6/2014 | Cheng | ................. | G06F 30/398 |
| | | | | 716/55 |
| 9,195,792 B2* | 11/2015 | Chen | ................. | G06F 30/36 |
| 9,256,706 B2* | 2/2016 | Chen | ................. | G06F 30/392 |
| 9,262,571 B2* | 2/2016 | Tuan | ................. | G06F 30/398 |
| 9,330,219 B2* | 5/2016 | Yang | ................. | G06F 30/394 |
| 9,665,676 B2* | 5/2017 | Yang | ................. | G06F 30/33 |
| 9,928,331 B2* | 3/2018 | Rozenfeld | ................. | G06F 30/36 |
| 10,380,307 B1* | 8/2019 | Wolf | ................. | G06F 30/39 |
| 10,409,943 B2 | 9/2019 | Chen et al. | | |
| 10,423,750 B1* | 9/2019 | Ginetti | ................. | G06F 30/34 |
| 10,719,657 B1* | 7/2020 | Feuillette | ................. | G06F 30/30 |
| 2008/0134109 A1* | 6/2008 | Hammouda | ................. | G06F 30/36 |
| | | | | 716/113 |
| 2011/0161907 A1* | 6/2011 | Cheng | ................. | G06F 30/398 |
| | | | | 716/119 |
| 2012/0233576 A1 | 9/2012 | Barrows et al. | | |
| 2014/0130004 A1* | 5/2014 | Kugel | ................. | G06F 30/392 |
| | | | | 716/122 |
| 2014/0380259 A1 | 12/2014 | Tuan | | |
| 2015/0067632 A1* | 3/2015 | Chen | ................. | G06F 30/398 |
| | | | | 716/129 |
| 2015/0143309 A1* | 5/2015 | De Dood | ................. | G06F 30/398 |
| | | | | 716/107 |
| 2015/0356224 A1* | 12/2015 | Rozenfeld | ................. | G06F 30/392 |
| | | | | 716/122 |
| 2017/0046470 A1* | 2/2017 | Allamraju | ................. | G06F 30/367 |
| 2018/0314783 A1* | 11/2018 | Moroz | ................. | G06F 30/367 |
| 2020/0057834 A1* | 2/2020 | Chang | ................. | G06F 30/392 |

* cited by examiner

```
1 @Cubism
2 layout 3to1_NAND
3 P [(745, 6455), (745, 4735)] [180,102,1]
4 P [(290, 1040), (-25, 1040), (-25, 4735), (1825, 4735), (1825, 7330)] [180,102,1]
5 B [(0, 5860), (2030, 5860), (2030, 6170), (0, 6170), (0, 5860)] [67,1]
6 B [(-190, 7410), (2220, 7410), (2220, 7900), (-190, 7900), (-190, 7410)] [6,1]
7 B [(-190, 5670), (2220, 5670), (2220, 6425), (-190, 6425), (-190, 5670)] [6,1]
8 P [(1555, 6140), (1555, 1480)] [180,101,1]
9 P [(1015, 6140), (1015, 1480)] [180,101,1]
10 P [(475, 6140), (475, 1480)] [180,101,1]
11 P [(1825, -165), (1825, 1290)] [180,101,1]
12 P [(1285, 6290), (1285, 7745)] [180,101,1]
13 P [(205, 6290), (205, 7745)] [120,101,1]
14 P [(-220, -520), (2250, -520)] [1000,101,1]
15 P [(-220, 8100), (2250, 8100)] [1000,101,1]
16 B [(0, 1295), (2030, 1295), (2030, 1720), (0, 1720), (0, 1295)] [66,1]
17 B [(-130, 0), (2160, 0), (2160, 1720), (-130, 1720), (-130, 0)] [31,1]
18 B [(-190, 5670), (2220, 5670), (2220, 7900), (-190, 7900), (-190, 5670)) [31,1]
19 I [(95, 7675)] [M1_NW$$193502252,0,0]
20 I [(95, -95)] (M1_SUB$$193499180,0,0]
21 I [(200, 410)] [M2M1_R$$193497132,0,0]
22 I [(1825, 6410)] [M2M1_R$$193496108,0,0]
23 I [(745, 6410)] [M2M1_R$$193496108,0,0]
24 I [(1550, 1500)] [M1_PO$$193494060,0,0]
25 I [(1005, 1500)] [M1_PO$$193494060,0,0]
```

FIG. 3

REUSABLE LAYOUT DATABASE 514 l1 [((335, 6290)] [p25,0,0]
l2 [((335, 290)] [n25,0,0]
l3 [T,(CommonSD,l1,r)] [p25,0,0]
l4 [T,(CommonSD,l3,r)] [p25,0,0]
l5 [T,(CommonSD,l2,r)] [n25,0,0]
l6 [T,(CommonSD,l5,r)] [n25,0,0]

FIG. 5B

LAYOUT DATABASE 506

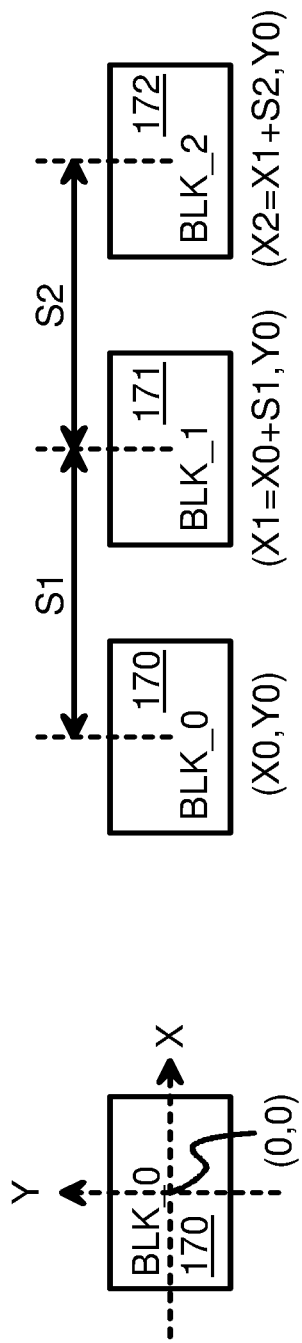
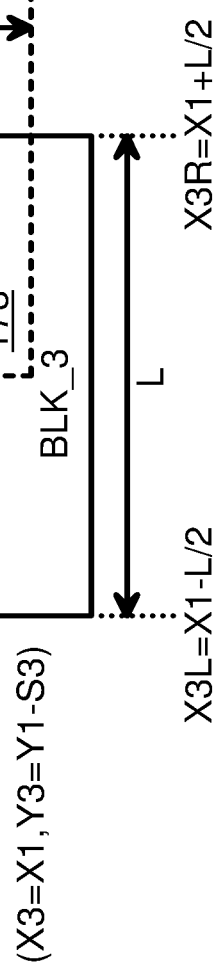
FIG. 6A
FIG. 6B
FIG. 6C

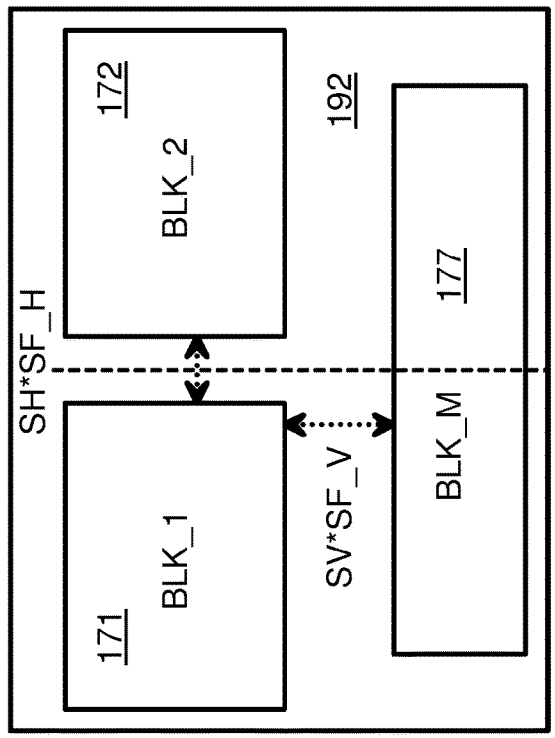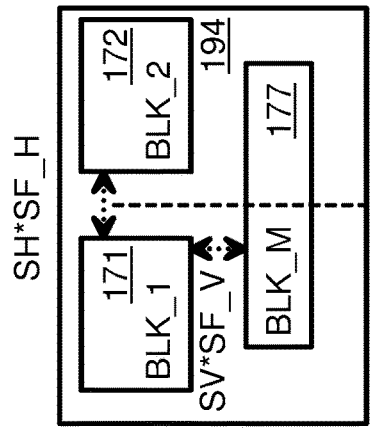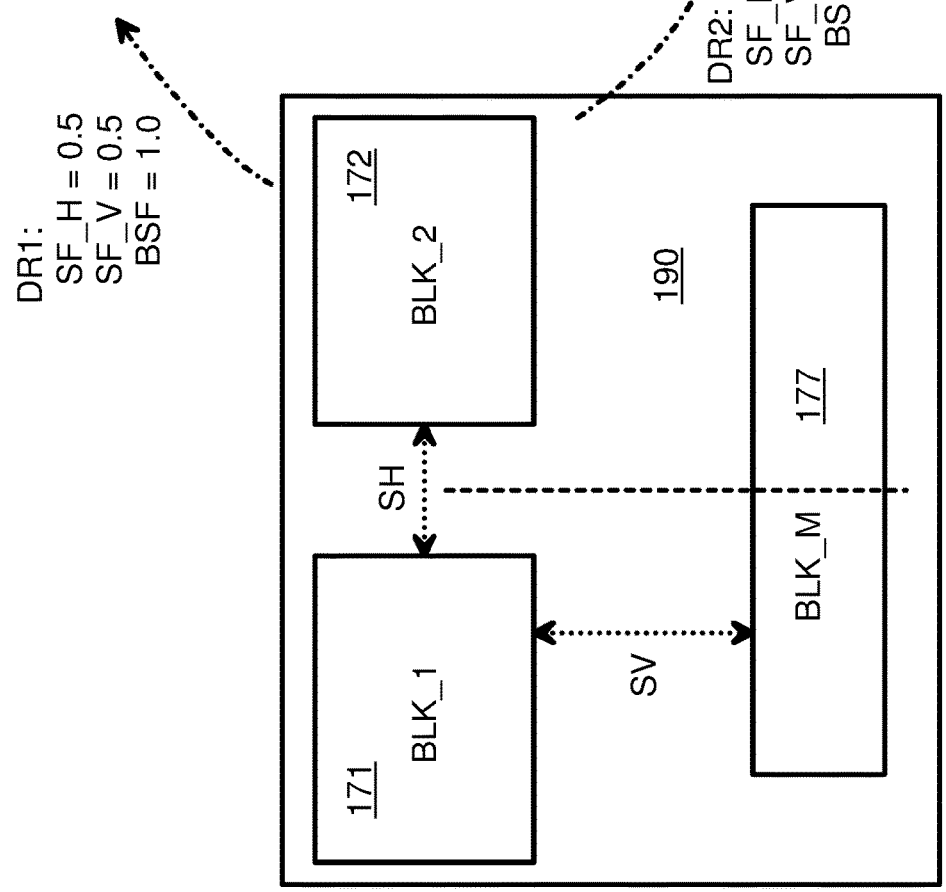

```
1  @LayoutDatabase
2  layout new_NAND
3  l1 [(335, 6290)] [p25,0,0]
4  l2 [(335, 290)] [n25,0,0]
5  l3 [T,(CommonSD,l1,t)] [p25,0,0]
6  l4 [T,(CommonSD,l3,r)] [p25,0,0]
7  l5 [T,(CommonSD,l2,r)] [n25,0,0]
8  l6 [T,(CommonSD,l5,r)] [n25,0,0]
9  l7 [T,(CommonCentre,l2,u)] [M1_PO,0,0]
10 l8 [T,(CommonCentre,l5,u)] [M1_PO,0,0]
11 l9 [T,(CommonCentre,l6,u)] [M1_PO,0,0]
12 l10 [T,(CommonCentre,l1,d)] [M1_PO,0,0]
13 l11 [T,(CommonCentre,l3,d)] [M1_PO,0]
14 l12 [T,(CommonCentre,l4,d)] [M1_PO,0,0]
15 B1 [T,(Rect,l1.AA_Left._l,l4.AA_Right._r,8600,7600)] [101,1]
16 B2 [T,(Rect,l2.AA_Left._l,l6.AA_Right._r,-20,-1020)] [101,1]
17 B3 [T,(Rect,l1.AA_Left._l,l1.AA_Left._r,B1._d,l1.AA_Left._d)] [101,1]
18 B4 [T,(Rect,l4.AA_Left._l,l4.AA_Left._r,B1._d,l4.AA_Left._d)] [101,1]
19 B5 [T,(Rect,l6.AA_Right._l,l6.AA_Right._r,l6.AA_Right._u,B2._u)] [101,1]
20 B6 [T,(Rect,l1.PO_Down._l,l1.PO_Down._r,l1.PO_Down._d,l2.PO_Up._u)] [101,1]
21 B7 [T,(Rect,l3.PO_Down._l,l3.PO_Down._r,l3.PO_Down._d,l5.PO_Up._u)] [101,1]
22 B8 [T,(Rect,l4.PO_Down._l,l4.PO_Down._r,l4.PO_Down._d,l6.PO_Up._u)] [101,1]
23 P1 [T,(Zshape,l4.AA_Right._r+90,l4.AA_Right._u,l2.AA_Left._1-90,l2.AA_Left._d,4000,180)] [102,1]
24 endlayout
```

FIG. 11

METHOD AND SYSTEM FOR INTEGRATED CIRCUIT (IC) LAYOUT MIGRATION INTEGRATED WITH LAYOUT EXPERTISE

FIELD OF THE INVENTION

This invention relates to Computer-Aided-Design (CAD), and more particularly to layout process-migration tools.

BACKGROUND OF THE INVENTION

A schematic of a circuit or of a larger system is converted to the physical devices by creating a layout of the physical devices specified by the schematic. This layout includes rectangles and other shapes that define clear and opaque regions on a photomask. A photomask is used to transfer the layout to a substrate that is being made into the physical devices. Many photomasks are created for the many layers that are added and etched during semiconductor device processing.

In the past, layouts were hand-drawn on Computer-Aided-Design (CAD) terminals by layout engineers or technicians. To reduce the layout time, standard cells or macros were hand-draw, and then placed in their relative locations and interconnected using place and route software. The hand-drawn cells were replicated many times. Standard layout stream formats such as GDSII (Graphics Design System 2 originally by Calma Company) allowed for hierarchal layouts in a binary streaming format.

Sometimes different sizes of the hand-drawn cells were needed. Parameter cells or P-cells were devised where the hand-drawn cell could be scaled in size by the parameters, such as the transistor channel width W or length L.

Such standard-cell layouts are very useful for digital circuits have wide tolerances. However, analog circuits have very tight tolerances and often require hand-drawn cells and the expertise of layout engineers. P-cells are sometimes used with analog designs to allow for analog transistors with different W/L's.

Each semiconductor process has a set of design rules. The design rules specify restrictions on the layout. These restrictions can include the minimum width of layers such as metal, polysilicon gates, contacts, and vias, and minimum spacings between adjacent lines within a layer and between different layers. Since the cost of Integrated Circuits (IC's) is proportional to their size, layout engineers tend to use these minimum spacings to produce the smallest cell layouts possible.

As semiconductor process technology advances, the minimum widths and spacings in the design rules tend to decrease or shrink for newer processes. Manufacturing costs per device can be reduced when these devices shrink when being migrated to a more advanced, smaller-feature-size process. Thus a layout created using design rules for an older process is sometimes adjusted to fit a new set of design rules for a newer process.

The original layout can be shrunk or scaled to a smaller size for use with the newer process. However, uniformly scaling all polygons in the layout by a fixed amount, such as 0.8 for a 20% shrink, can cause some design rules in the new process to be violated. These violations occur because the design rules do not shrink uniformly. For example, the polysilicon gate length and width may scale by 0.8, but the metal line width and spacing may scale by only 0.9, causing the metal design rules to be violated when the original design is uniformly shrunk by a 0.8 factor.

The expertise of the layout engineer is often needed in these layout migration situations. The design rules tend to become more numerous and complex for smaller processes, requiring more skill, expertise, and effort by the layout engineer. The placement of the cells, or floorplan of the original design, can often be re-used during layout migration only with extensive manual adjustments by the layout engineer.

Automated layout migration software may require the use of P-cells, or may introduce constraints that take into account the original and new design rules. These constraints are defined for one particular set of target design rules. It is desired to be able to migrate the layout to several sets of target design rules for several semiconductor processes. Having more than one target process allows a circuit to be second-sourced or manufactured by more than one foundry, possibly lowering the cost by introducing price competition among multiple foundries.

What is desired is layout migration to multiple processes having multiple sets of design rules. A reusable layout that can be automatically converted to any of several layouts for different sets of design rules is desirable. One-to-many layout migration is desirable. A software toolkit that allows a layout engineer to add his expertise to create the reusable layout is desired. Layout migration from a standard hierarchal layout database such as GDSII without P-cells and constraints is desirable.

BRIEF DESCRIPTION OF THE DRAWINGS

FIG. 3 is a sample of text entries in the layout database file created by the layout parser.

FIGS. 5A-5B show text lines in the layout database file being revised by the layout engineer to generate reusable layout database.

FIGS. 6A-6C illustrate placement of cells in the reusable layout database.

FIGS. 8A-8C illustrate layout migration from the reusable layout database to two target layouts for two sets of target design rules.

FIG. 11 shows a section of reusable code that generates the 3-input NAND layout of FIG. 10D.

DETAILED DESCRIPTION

The present invention relates to an improvement in layout migration tools. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
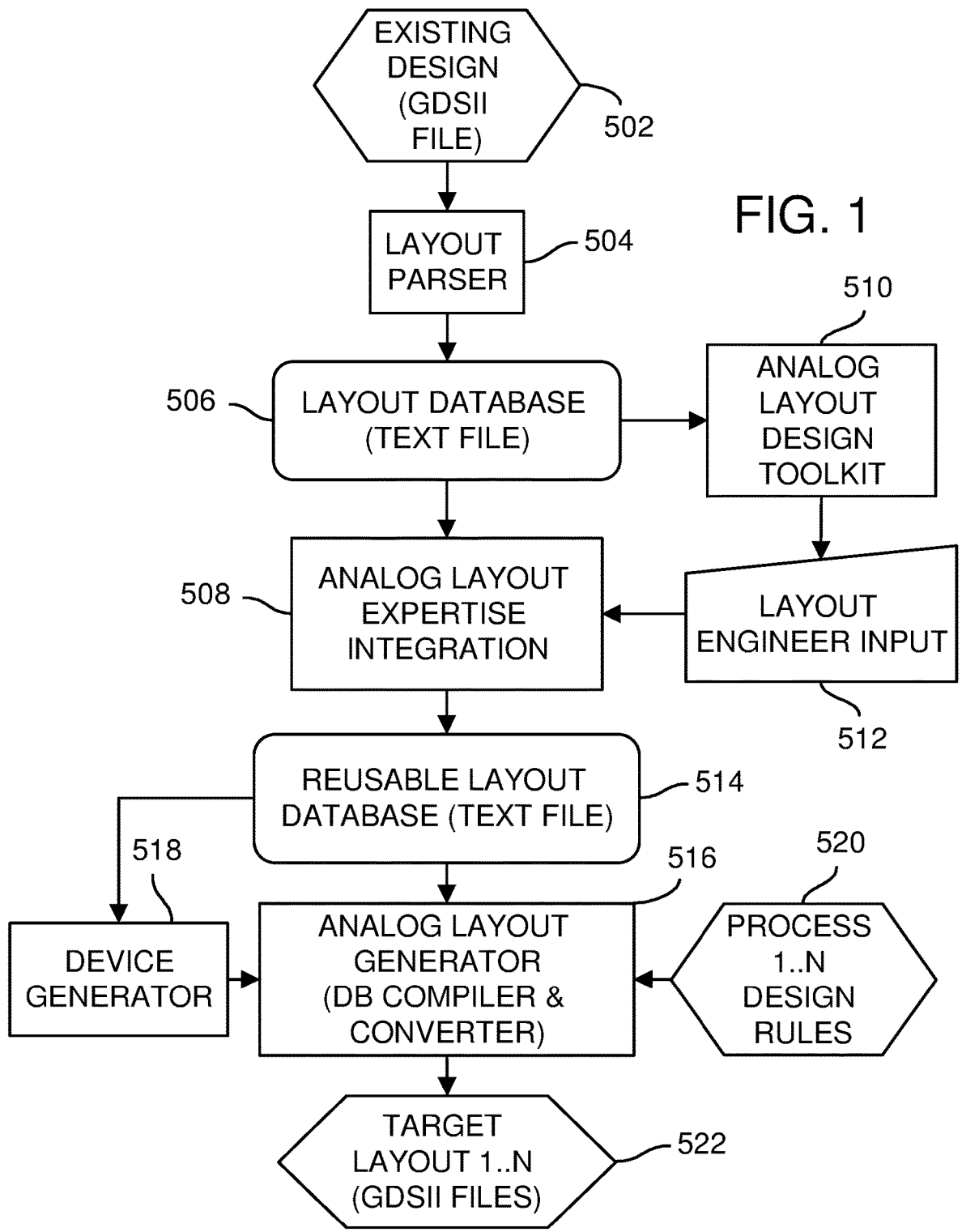
FIG. 1 is a flowchart of one-to-many layout migration using a reusable layout database integrated with layout engineer expertise.

FIG. 1 is a flowchart of one-to-many layout migration using a reusable layout database integrated with layout engineer expertise. The existing layout is specified using the binary GDSII format that is commonly used by semiconductor process foundries. The existing layout design GDSII file 502 is streamed in, converted, and parsed by layout parser 504. Layout parser 504 reads a local converted copy of the binary streamed GDSII file 502 and extracts polygons on the different layers to create text entries specifying these polygons in layout database file 506, which is in a text-based format. Layout parser 504 keeps the hierarchy specified in GDSII file 502 when generating layout database file 506. Thus reusable standard cells need to be specified only once in GDSII file 502 and in layout database file 506.

Analog layout design toolkit 510 allows the layout engineer to get the x,y locations of these polygons in layout database file 506. The layout engineer can then write code to better specify the devices formed by these polygons and to better allow for migrating to different sets of design rules. The layout engineer uses a keyboard or other input 512 to over-write the text lines in layout database file 506 specifying the polygons with reusable code that describes these polygons.

Analog layout expertise integrator 508 replaces or over-writes the text entries in layout database file 506 with the reusable code from input 512 to integrate the layout engineer's expertise. Analog layout expertise integrator 508 modifies layout database file 506 with the re-usable code that the layout engineer inputs to form reusable layout database 514.

Reusable layout database 514 contains both the reusable code from input 512 and the remaining text entries from layout database file 506. The reusable code from the layout engineer's expertise activates functions in analog layout generator 516 or device generator 518. Engineers can customize their own P-cell in any geometry with design toolkit 510. Such customized P-cells can be single devices such as a test key or may be embedded in the circuit that generates device layouts specified by the reusable code.

Analog layout generator 516 combines device layouts created by device generator 518 with the polygons specified by the text entries in reusable layout database 514 that were originally in layout database file 506 when compiling the layout. The compiled layout is then converted to each of the target processes 1, 2, 3, ... N using design rules 520 for multiple semiconductor manufacturing processes. The multiple converted layouts are then output by analog layout generator 516 as target layouts 1, 2, 3, ... N. These target layouts are converted from the text format to the binary format of GDSII to generate target layout GDSII files 522.

Figure 2:
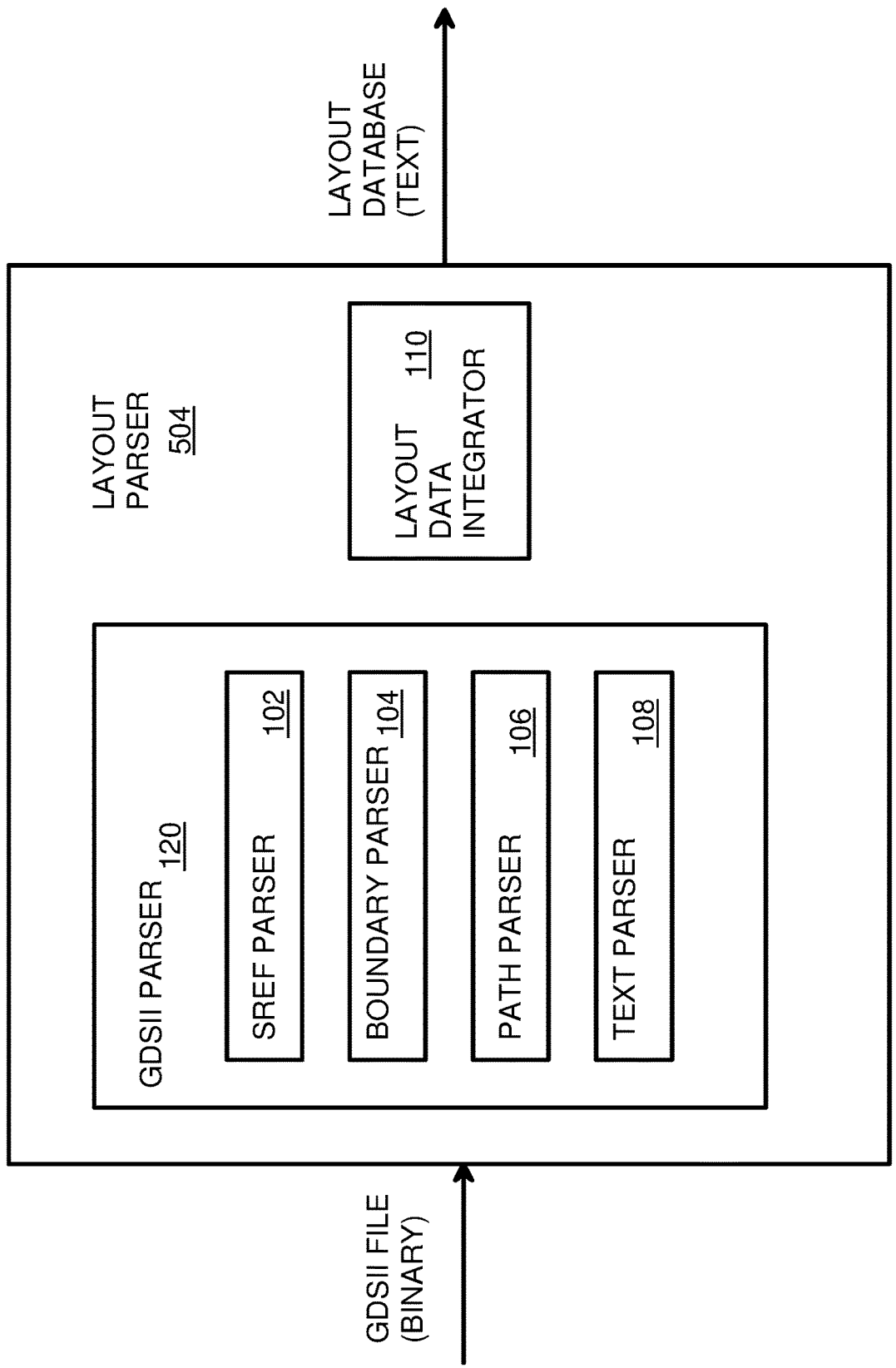
FIG. 2 shows the GDSII layout parser in more detail.

FIG. 2 shows the GDSII layout parser in more detail. Layout parser 504 receives GDSII file 502 (FIG. 1), which specifies the original layout using the original design rules. The binary stream is parsed by GDSII parser 120 for identifiers of records in the GDSII format. These record-type identifiers delineate 4 kinds of GDSII data items. SREF parser 102 searches for SREF record-type identifiers for references to standard cells or other cells in the hierarchal layout. These SREF identifiers specify the x,y location an instance of a cell that is specified elsewhere. SREF can also mirror or rotate the cell instance.

Boundary parser 104 searches for records for polygon boundaries. A boundary (B) record-type has a list of x,y coordinates of vertices for the close polygon. These polygons can have a process layer specified.

Path parser 106 searches a copy of the streamed GDSII file 502 for path data items. A path record-type is for a line or a series of line segments that can be expanded in width. Paths are especially useful to form metal interconnect.

Text parser 108 searches for records of text data items. Text is often added to the layout to label transistors, logic gates, cells, and metal lines. The text can help layout engineers understand the layout and its correspondence to the schematic. This text is removed before creating the photomasks during manufacturing so that the text does not appear on the final physical devices.

Multiple polygons or other structures can be grouped together to form a container structure or cell using the begin structure (BEGSTR) and end structure (ENDSTR) GDSII record types. The structure or cell's name may be defined within the container structure by the structure name (STRNAME) record type.

Layout data integrator 110 re-arranges the records parsed by SREF parser 102, boundary parser 104, path parser 106, and text parser 108 to reflect the hierarchy of the structures or cells. Layout data integrator 110 creates lines of text for each of the data items found by GDSII parser 120. These lines of text are output by layout parser 504 as layout database file 506 (FIG. 1).

FIG. 3 is a sample of text entries in the layout database file created by the layout parser. Line 2 is an example of a text data item from GDSII file 502 when text parser 108 locates a text record and layout parser 504 creates layout database file 506.

Paths are written as lines beginning with "P", such as lines 3, 4, and 9-15. These path lines have 2 x,y coordinates of the path endpoints, and path attributes such as the width (180) and the layer, such as second metal (102,1).

Boundaries are written as lines beginning with "B", such as lines 5-7 and 16-18. Each boundary in this example has 5 x,y coordinates, with the first and last coordinate being the same for a closed rectangular polygon. Boundaries could have more than 5 points.

SREF parser 102 (FIG. 2) identifies instance references of standard cells or other blocks. These instance references are converted to text lines that start with "I" in layout database file 506, such as lines 19-25. Each instance line has an x,y coordinate that the instance of the cell is placed at, and the name of the cell being called.

Figure 4:
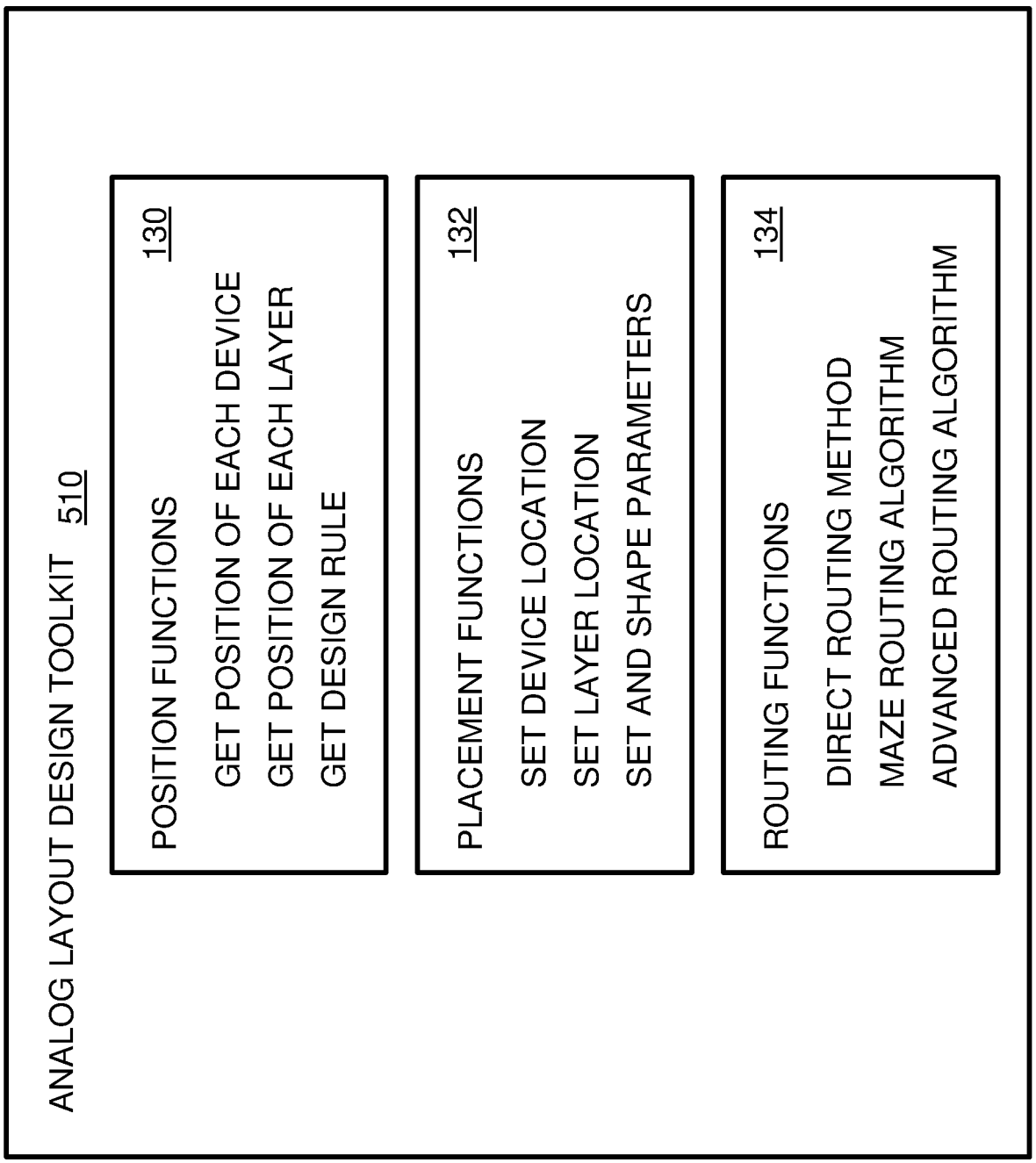
FIG. 4 is a diagram of the analog layout design toolkit.

FIG. 4 is a diagram of the analog layout design toolkit. Analog layout design toolkit 510 allow the layout engineer to integrate his expertise into reusable layout database 514 (FIG. 1). The layout engineer uses functions in analog layout design toolkit 510 to rewrite lines of text in layout database file 506 to include reusable code that facilitates migration of reusable layout database 514 to multiple processes with different sets of design rules.

Analog layout design toolkit 510 includes position functions 130, placement functions 132, and routing functions 134. The layout engineer can use position functions 130 to find the position or x,y coordinate location of devices and polygons on various layers. The original design rules are used to build up a reusable layout database and reproduce the existing layout. Then the target design rules are used to generate new GDSII structures with the reusable database. Position functions 130 can use a systematical algorithm to descript relative location between elements, such as up, down, left, right. With such a definition, a detail evaluation can be done when the engineer specifies the element number in the reusable database, such as shown later in FIG. 5B. The element can be any polygon, device, or instance, as defined by engineer. For example, I3[T, (CommonSD, I1, r)], specifies that element I3 will be located to the RIGHT of the element I1. Here, the relative RIGHT is defined by the position function "r". I1 and I3 are specified as instances of a MOSFET cell.

The layout engineer uses placement functions 132 to place cells and polygons at locations in reusable layout database 514. The locations can be specified as absolute x,y coordinates, or as relative locations to other cells or polygons. The relative locations can be specified as a function of a design rule, such as 1.5 times a minimum spacing design rule, where the value of the design rule is not yet specified. Placement functions 132 can also include symmetric placement functions, such as placing polygons along a common line, or arraying cells in one or two dimensions.

Routing functions 134 connect cells together using two or more layers of interconnect metal, vias, and contacts. The path data items in GDSII file 502 are often used to specify interconnect. After placement of transistors and cells are adjusted for different design rules, the interconnect can be re-routed between the path endpoints. The layout engineer can specify various routine methods, such as direct routing, maze routine, star-search routing, routing using a reinforcement learning algorithm, or routing using Artificial Intelligence (AI). The layout engineer may recognize that some paths are better routed using one routing method rather than other routing methods, and can use routing functions 134 to specify the best routing method for a path, based on the engineer's past experience and expertise.

Using analog layout design toolkit 510, the layout engineer can integrate his expertise into reusable layout database 514, allowing reusable layout database 514 to be reused for multiple target layouts for different sets of design rules.

FIGS. 5A-5B show text lines in the layout database file being revised by the layout engineer to generate reusable layout database. In FIG. 5A, a section of layout database file 506 (FIG. 1) shows 6 instance lines. The first, third, and fourth lines each call for an instance of p25, which could be a Complementary Metal-Oxide-Semiconductor (CMOS) p-channel transistor (PMOS) that is limited to 2.5-volt maximum signals. The second, fifth, and sixth lines call for instances of n25, which could be a n-channel transistor (NMOS) with the 2.5-volt maximum. The layout engineers could specify channel widths of these p25, n25 transistors using other attributes.

The x,y coordinates for each instance are also provided on each line. The p25 devices are all at Y=6290 while the n25 devices are all at Y=290. The first pair of p and n devices is at X=335, the second pair at X=875, and the third pair at X=1415. Thus the 6 transistors are arrayed with the PMOS devices centered 6000 units above the NMOS devices, with adjacent transistors spaced 540 units apart, center-to-center.

The layout engineer can view lines in layout database file 506, such as shown in FIG. 5A. These six lines in FIG. 5A call for six separate transistors, 3 PMOS and 3 NMOS transistors.

The engineer might recognize that adjacent transistors could share their source/drain regions, rather than have separate source/drains. The engineer can use placement functions 132 to re-write the third line using the common source/drain placement function, CommonSD. This is a relative placement function that causes the transistor to be placed very close to an adjacent transistor, sharing the source/drain region and its contacts. The third line in layout database file 506:

I [(875, 6290)] [p25,0,0]

is replaced with the line in the re-written section of reusable layout database 514 specifying instance I3 using the CommonSD function:

I3 [T,(CommonSD,I1,r)] [p25,0,0]

The absolute coordinates (875, 6290) in layout database file 506 are removed and replaced with the relative placement function CommonSD that has no x,y coordinates, but instead specifies that the source/drain is to be shared with instance I1.

Likewise, the absolute coordinates of the p25 transistor in line 4 and the n25 transistors in lines 5 and 6 are removed and replaced with CommonSD functions. Instance I4 shares a source/drain with I3, n25 instance I5 shares a source/drain with instance I2 of n25, and instance I6 shares a source/drain with I5. The parameter r indicates that the right-side source/drain is shared, not the left-side source/drain.

The layout engineer can manually edit layout database file 506 and type in the CommonSD function and its parameters to generate reusable layout database 514. Analog layout design toolkit 510 can define the functions, parameters, and syntax, allowing the layout engineer to select placement functions 132 such as CommonSD to use to define relative placements of other instances of the n25 and p25 transistor cells.

FIGS. 6A-6C illustrate placement of cells in the reusable layout database. In FIG. 6A, block 170 is placed at an absolute x,y location in the floorplan of the layout. Block 170 can be a cell having many polygons on many layers, or can be a single polygon, or can be a parameterized cell. The center (0,0) of block 170 is placed at the absolute x,y position by absolute placement functions, such as shown in the first 2 lines of FIG. 5B.

In FIG. 6B, a series of 3 blocks 170, 171, 172 are placed in a horizontal sequence. First block 170 is placed at absolute location X0,Y0 by an absolute placement function. However, blocks 171, 172 are placed relative to first block 170, rather than at absolute locations. The center of block 171 is placed a distance of S1 from the center of first block 170, while the center of block 172 is a distance of S2 from the center of second block 171. Thus first block 170 is placed at X0, Y0, second block 171 is placed at X1,Y0, where X1=X0+S1, and third block 172 is placed at X2,Y0, where X2=X1+S2.

The spacing values S1, S2 can be a function of the design rule, allowing the spacings to be adjusted for different sets of design rules. For example, when blocks 170, 171, 172 are all minimum width metal lines with minimum spacing, S1 and S2 can be the minimum pitch for the target design rule. When blocks 170, 171, 172 are more complex cells, S1 can be the width of the cell plus a minimum spacing between cells, which might be set by a metal-to-metal spacing design rule. Alternately, the layout engineer may use a larger spacing between cells to allow for more interconnect and easier routing.

In FIG. 6C, cells are aligned along a vertical axis. The centers of blocks 171, 173 are aligned so that they have the same X coordinate of their centers, X3=X1. Since block 173 has a greater width L than does block 171, the lower corners of block 173 can be calculated as X3L=X1−L2 and X3R=X1+L2.

The centers of blocks 171, 173 are spaced a distance S3 apart vertically, so that when block 171 is centered at X1,Y1, block 173 is centered at X1,Y1−S3. Again, the spacing S3 can be a function of the target design rules plus an extra amount that the layout engineer adds, such as for better routing or for circuit performance such as for latch-up resistance. The value of the design rule is left as a parameter rather than being specified as a numeric value, allowing the design rule to be selected from various sets of target design rules. This allows the cell placements in reusable layout database 514 to be reusable for many processes.

Analog layout design toolkit 510 includes a Common-Centre function in placement functions 132. This Common-Centre function places a block, such as block 173, in a relative position along a common center with another block. The spacing S3 can be specified in the function call, such as the minimum spacing allowed by the design rule. Also, the CommonCentre function can be specified for either horizontal (FIG. 6B) or vertical (FIG. 6C) alignment and symmetry.

Figure 7:
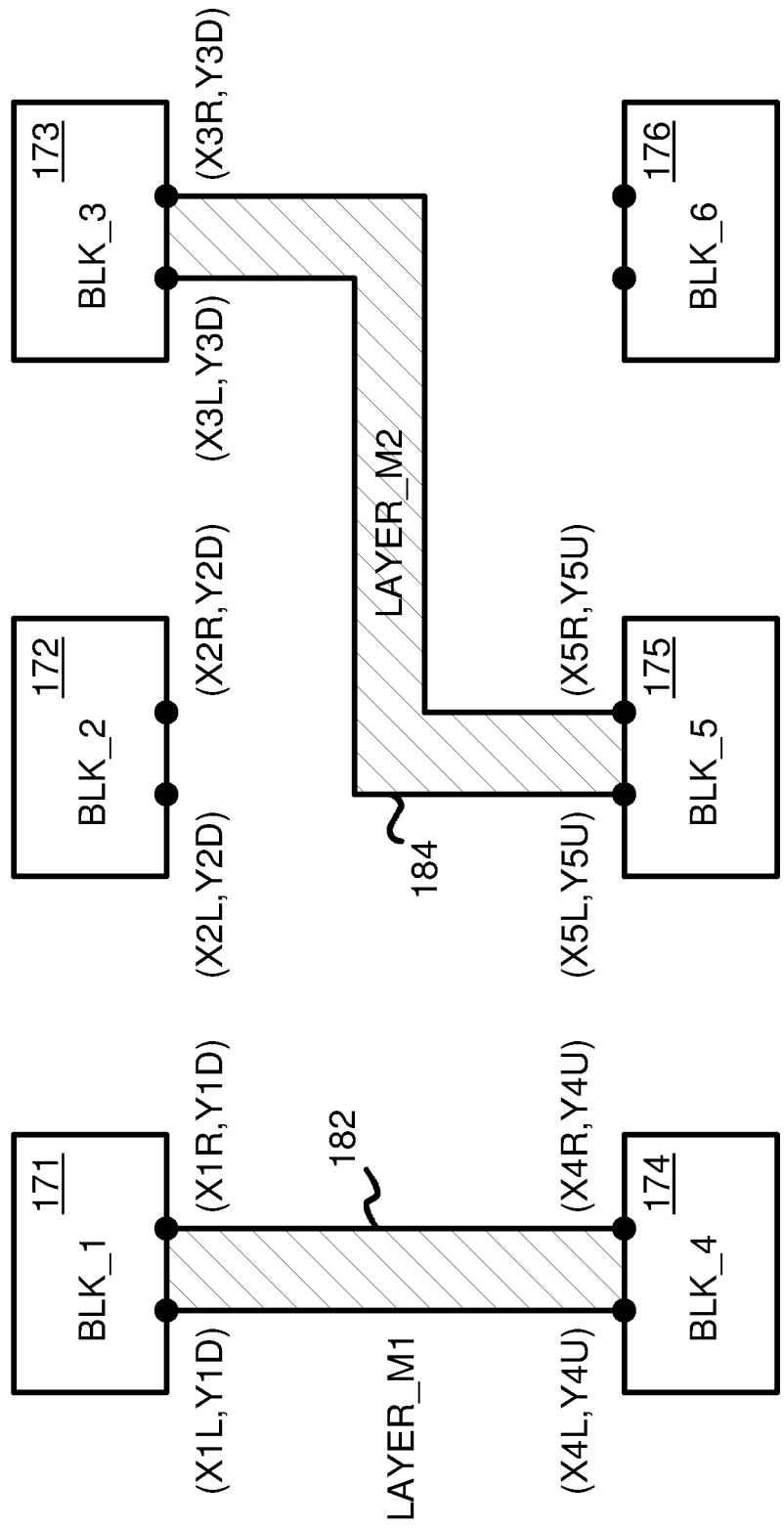
FIG. 7 illustrates routing in the reusable layout database.

FIG. 7 illustrates routing in the reusable layout database. Blocks 171-176 are six cells that are arrayed in two rows, three cells per row. The cells may differ internally and may be mirror images in the two rows.

Connections are made to the cell a connection points along the cell border. In this example, the connection points are defined for both a first metal layer and a second layer. For example, block 171 has connection points X1L, Y1D and X1R, Y1D along its lower boundary. Block 174 has connection points X4L, Y4U and X4R, Y4U along its upper boundary.

A connection between blocks 171, 174 can be defined using routing functions 134, or by path data items from layout database file 506. The routing routine implements this connection using layer-1 metal 182, by creating a rectangle between connection points X1L, Y1D and X1R, Y1D on block 171, and X4L, Y4U and X4R, Y4U on block 174. In this example, X1L=X4L, and X1R=X4R.

The reusable layout database 514 also contains a line calling a Z-shaped routing function in routing functions 134. The routing function generates a Z-shaped polygon to implement this connection using layer-2 metal 184, by creating a polygon on the metal-2 layer between connection points X3L, Y3D and X3R, Y3D on block 173, and X5L, Y5U and X5R, Y5U on block 175.

FIGS. 8A-8C illustrate layout migration from the reusable layout database to two target layouts for two sets of target design rules. In FIG. 8A, original layout 190 was created using original design rules and converted to reusable layout database 514, specifying that the relative placement of block 177 is below the center of the space between blocks 171, 172. Blocks 171, 172 are spaced horizontally with a spacing SH between the edges of the blocks, while block 177 is placed below blocks 171, 172 with a spacing SV between block edges.

Once analog layout design toolkit 510 has been used to integrate the layout engineer's expertise into reusable layout database 514, reusable layout database 514 can be used to convert the original layout 190 to two target layouts 192, 194 that use design rules DR1, and DR2, respectively.

In FIG. 8B, analog layout generator 516 (FIG. 1) converts reusable layout database 514 for original layout 190 into first target layout 192 using first design rules DR1. Analog layout generator 516 or engineers can compare the original design rules to the first design rules to obtain horizontal and vertical scaling factors SF_H and SF_V, and block scaling factor BSF. The block scaling factor BSF may be limited by the design rules having the least amount of shrinkage between the two sets of design rules for the many layers of polygons in a typical cell. The spacing scaling factors may depend on the ratio of just the metal layer design rules that determine the spacing between blocks.

The block scaling factor BSF is used to scale the size of the blocks or cells. For first target layout 192, BSF is 1.0, so blocks 171, 172, 177 are not scaled down in size. However, spacing scaling factors SF_H and SF_V are both 0.5, so the spacing between cells is reduced by 50% when original layout 190 is migrated to first target layout 192. Although the blocks are not reduced in size, the reduced spacing between blocks allows first target layout 192 to be somewhat smaller than original layout 190.

Reusable layout database 514 can also be converted to second target layout using second design rules DR2. Second design rules DR2 are better than first design rules DR1 since block scaling factor BSF is 0.5, and the vertical scaling factor SF_V is reduced even further to 0.25, although the horizontal scaling factor SF_H remains at 0.5 for both design rules DR1, DR2.

For second target layout 194, BSF is 0.5, so blocks 171, 172, 177 are each scaled down in both the horizontal and vertical directions by 50% before placement. Spacing scaling factor SF_H is 0.5, so the horizontal spacing between the edges of the reduced blocks 171, 172 is reduced to SH*SF_V, where SH is the original horizontal spacing from original layout 190.

The vertical spacing SF_V has been shrunk more, to 0.25, so the vertical spacing between blocks 171 and 177 is reduced by 75%. Blocks 171, 172, 177 are reduced in size and the spacing between blocks is reduced, so second target layout 194 is much smaller than original layout 190.

Figure 9B:
FIGS. 9A-9C illustrate the analog layout generator creating cell layouts using placement functions embedded into the reusable layout database by the layout engineer.
Figure 9A:
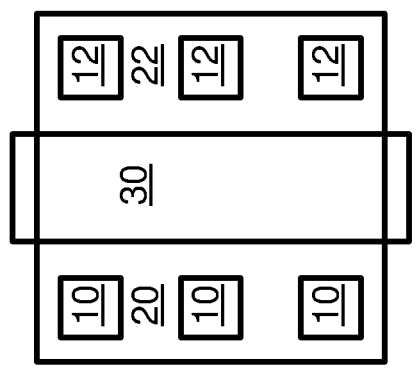
Figure 9C:
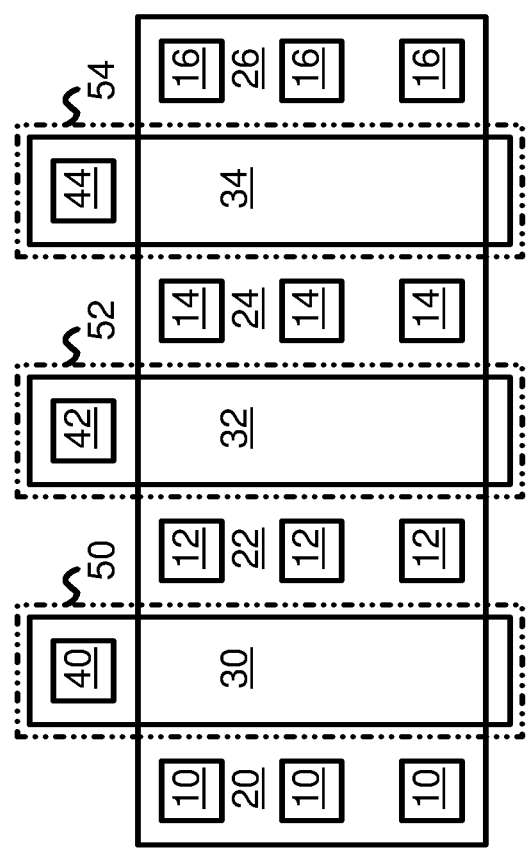

FIGS. 9A-9C illustrate the analog layout generator creating cell layouts using placement functions embedded into the reusable layout database by the layout engineer. When processing the code of FIG. 5B in reusable layout database 514, the second line calls on analog layout generator 516 to generate an instance of the n25 cell, which is a NMOS transistor:

I2 [(335, 290)][n25,0,0]

This line causes analog layout generator 516 to generate an n-channel transistor by a creating polysilicon layer rectangle for gate 30, a diffusion rectangle that includes source/drain regions 20, 22, source contacts 10 and drain contacts 12. The intersection of the polysilicon and diffusion rectangles is the active gate area of the transistor. The center of this transistor is placed at the absolute location 335,290. This first transistor is shown in FIG. 9A.

The fifth line of reusable code,

I5 [T,(CommonSD,I2,r)] [n25,0,0]

calls for generating another n25 cell, but no absolute x,y location is given. Instead, the CommonSD function is called, with I2 and r as function-call parameters. This function causes analog layout generator 516 to generate this new transistor with its source/drain region shared with the right-side source/drain region of the transistor created by instance I2.

In FIG. 9B, the I2 transistor gate 30 still has source contacts 10 in source/drain region 20, but drain contacts 12 and source/drain region 20 are shared with I5 transistor gate 32. Analog layout generator 516 also generates shared contacts 14 and source/drain region 24 to the right of I5 transistor gate 32. The diffusion rectangle has been extended to the right to include I5 transistor gate 32 and source/drain region 24.

Next, analog layout generator 516 processes the sixth line of reusable code:

I6 [T,(CommonSD,I5,r)] [n25,0,0]

which calls for generating a third n25 cell, with no absolute x,y location given. Instead, the CommonSD function is called, with I5 and r as function-call parameters. This function causes analog layout generator 516 to generate this new transistor with its source/drain region shared with the right-side source/drain region of the transistor created by instance I5.

In FIG. 9B, shared contacts 14 and source/drain region 24 to the right of I5 transistor gate 32 are now shared with I6 transistor gate 34. Analog layout generator 516 generates contacts 16 and source/drain region 26 to the right of I6 transistor gate 34. The diffusion rectangle is extended again, to the right, to include I6 transistor gate 36 and source/drain region 26.

PMOS transistors could be generated in a similar manner to that described in FIGS. 9A-9B for the other lines in FIG. 5B:

I1 [(335, 6290)] [p25,0,0]
I3 [T,(CommonSD,I1,r)] [p25,0,0]
I4 [T,(CommonSD,I3,r)] [p25,0,0]

In FIG. 9C, analog layout generator 516 extends gate 30 upward and adds metal contact 40 with sufficient spacing to meet the target design rules. This spacing distance is parameterized by the design rules. First-layer metal 50 is added over metal contact 40 and extends vertically over the cell.

Similarly, analog layout generator 516 extends poly gates 32, 34 upward and adds metal contacts 42, 44 and first-layer metal 52, 54.

Since source/drain regions 22, 24 are each shared with two transistors, the overall size of the three transistors for instances I2, I5, I6 is reduced compared with isolated transistors that have their own, unshared, source/drain regions. The layout engineer's expertise in recognizing that the source/drain regions can be shared for these transistors is added into reusable layout database 514 using the CommonSD function from analog layout design toolkit 510. Layout migration to multiple target processes is improved.

Figure 10B:
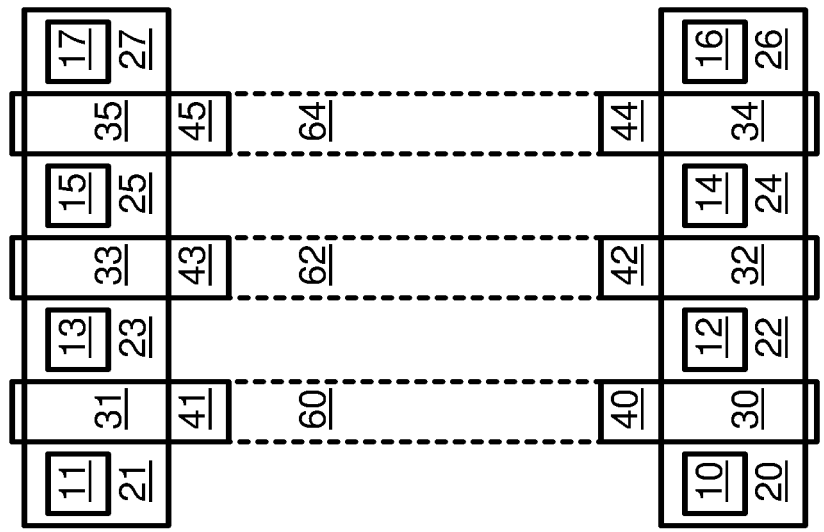
FIGS. 10A-10D illustrate the analog layout generator creating cell layouts using routing functions embedded into the reusable layout database by the layout engineer.
Figure 10A:
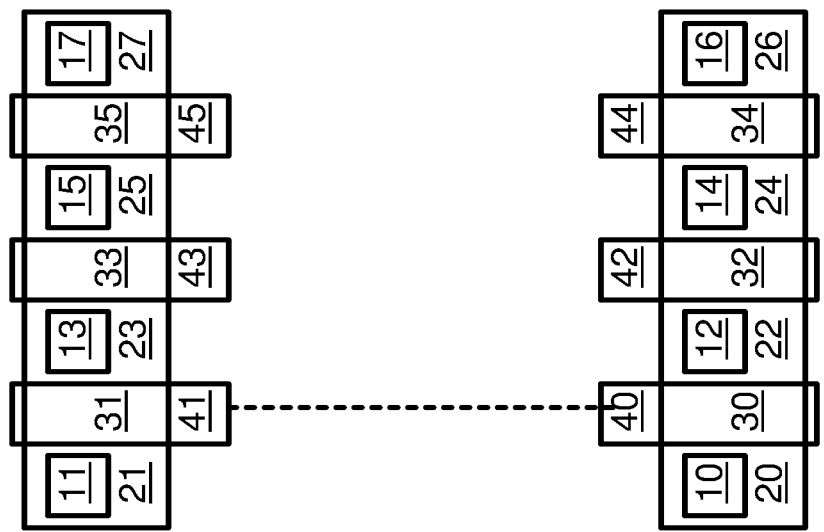

FIGS. 10A-10D illustrate the analog layout generator creating cell layouts using routing functions embedded into the reusable layout database by the layout engineer. In FIG. 10A, transistor gates 30, 32, 34 with shared source/drain regions 22, 24 and metal contacts 40, 42, 44 are shown at the bottom. These are the I2, I5, I6 NMOS transistors shown in FIG. 9C.

Also shown at the top are transistor gates 31, 33, 35 with shared source/drain regions 23, 25, non-shared source/drain regions 21, 27 at the ends, and contacts 11, 13, 15, 17. These can be generated for instances I1, I3, I4, shown in FIG. 5B for the code segment of reusable layout database 514.

Metal contacts 41, 43, 45 are also generated to connect to the polysilicon gates 31, 33, 35. These metal contacts 41, 43, 45 are generates at the bottom of the PMOS transistor gates 31, 33, 35, rather than at the top as for NMOS transistor gates 30, 32, 34.

These metal contacts can be created using a Common-Center function in placement functions 132. The Common-Center function causes metal contact 43 to be aligned with its polysilicon gate. For example, line 13 of the segment of reusable layout database 514 code shown later in FIG. 11 is:

13 I11 [T,(CommonCentre,I3,d)] [M1_PO,0]

and causes analog layout generator 516 to generate a metal-1-to-polysilicon contact (M1_PO) at the bottom of instance I3 (I3,d) and having a common center with I3. PMOS gate 31 is aligned to NMOS gate 30 because both instances I1, I2 have the same absolute X coordinate.

In FIG. 10B, the layout engineer has used one of routing functions 134 to generate interconnect. The rectangle (rect) routing function is used to generate a simple rectangle to connect I1 and I2 using first-layer metal (101). This is shown in line 20 of FIG. 11, where boundary B6 is listed:

20 B6 [T, (Rect,I1.PO_Down._1, I1.PO_Down._r, I1.PO_Down._d,I2.PO_Up._u)][101,1]

First-layer metal 60 is generated by this line of reusable code, connecting metal contacts 40, 41 to transistor gates 30, 31. The first two points in the rect function are relative to the I2 polysilicon lower left (I1.PO_Down_1), and lower right, (I1.PO_Down_r). The other two points in the rect function, I1.PO_Down._d, and I2.PO_Up._u, are the lower and upper edges of metal 60. I1.PO_Down._d is the lower edge of PO contact 41, and I2.PO_Up._u is the upper edge of PO contact 40.

Similarly, other lines of reusable code use the rect routing function to generate first-layer metal 62 to connect metal contacts 42, 43 to transistor gates 32, 33, and first-layer metal 64 to connect metal contacts 44, 45 to transistor gates 34, 35.

Figure 10D:
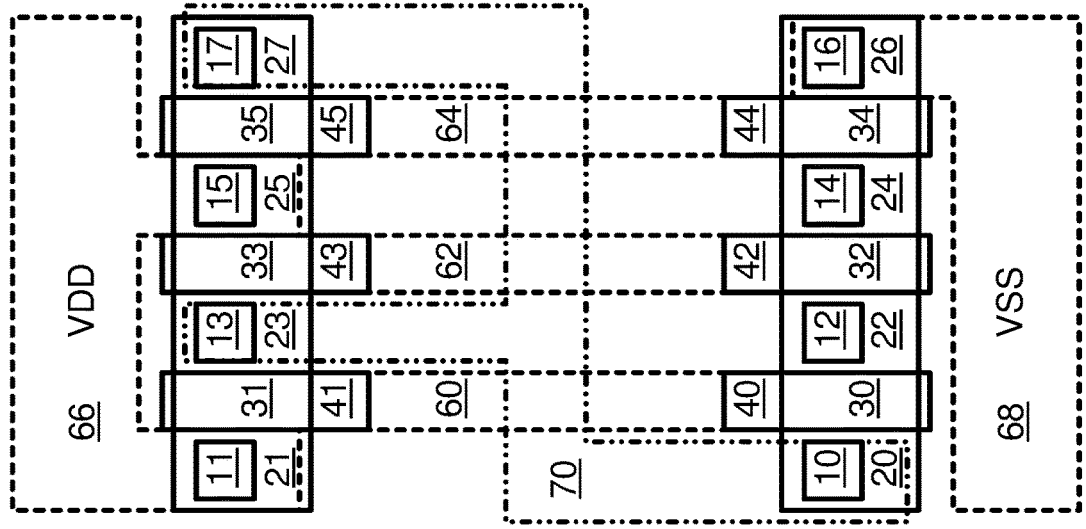
Figure 10C:
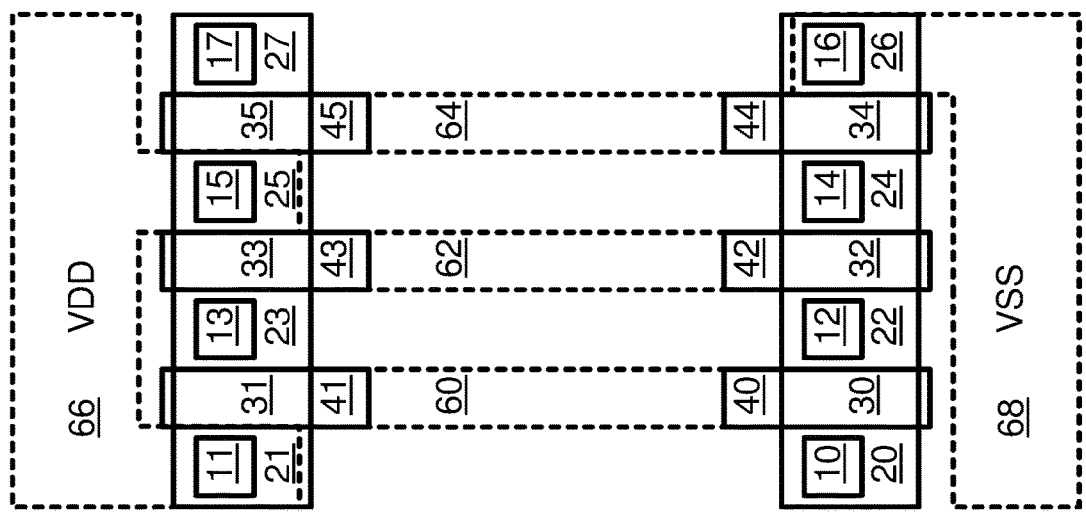

In FIG. 10C, other rect routing functions 134 are used to generate VDD metal 66 and VSS metal 68 on the first metal layer. VDD metal 66 connects to contacts 11, 15 in source/drain regions 21, 25, which act as PMOS sources connected to power. VSS metal 68 connects to contact 16 in source/drain region 26, which act as the NMOS source connected to ground.

In FIG. 10D, second-layer metal 70 is generated by analog layout generator 516. Second-layer metal 70 connects to the cell output (not shown) and to contact 10 in source-drain region 20, to contact 13 in source/drain region 23, and to contact 17 in source/drain region 27. A 3-input NAND gate is formed.

Second-layer metal 70 is generated by analog layout generator 516 processing line 23 in the section of reusable code of reusable layout database 514 shown in FIG. 11. This line uses the Zshape routing function that produces a zig-zag metal line using second metal (parameter 102).

23 P1 [T,(Zshape,I4.AA_Right_r+90,I4.AA_Right._u, I2.AA_Left._1−90,I2.AA_Left._d,4000,180)][102,1]

This line of reusable code defines a Z-shaped polygon of second metal (102,1) that is centered at Y=4000 and is 180 nm wide. The right edge extends 90 nm past non-shared source/drain region 27 (I4.AA_Right_r+90). The left edge extends 90 nm past non-shared source/drain region 20 (I2.AA_Left._1−90).The upper edge is non-shared source/drain region 27 (I4.AA_Right_u) and the lower edge is non-shared source/drain region 20 (I2.AA_Left._d).

FIG. 11 shows a section of reusable code that generates the 3-input NAND layout of FIG. 10D. The section of reusable code in FIG. 11 is part of reusable layout database 514, with lines 5-23 being written by the layout engineer and lines 1,2 being moistly unchanged, except for adding instance names (I1,I2) use for further reference.

Lines 5-8 generate the transistors with the shared source/drain regions using the CommonSD placement function. Lines 4, 7,8 generate the NMOS transistor gates 30, 32, 34 and contacts and source/drains as shown in FIG. 9B. Metal contacts 40, 42, 44 shown in FIG. 9C are added by lines 9-11 using the CommonCenter placement function for metal-1-to-poly contacts (M1_PO), while metal contacts 41, 43, 45 shown in FIG. 10A are added by lines 12-14 using the CommonCenter placement function.

The complex shape of VDD metal 66 is generated by lines 15, 17, 18 using the rect routing function to generate 3 rectangles. VSS metal 68 is generated by lines 16, 19 using the rect routing function to generate 2 rectangles.

First-layer metal 60, 62, 64 are generated by lines 20, 21, 22, respectively, using the rect routing function. Finally, second-layer metal 70 is generated by line 23 in FIG. 11, using the Zshape routing function.

Figure 12:
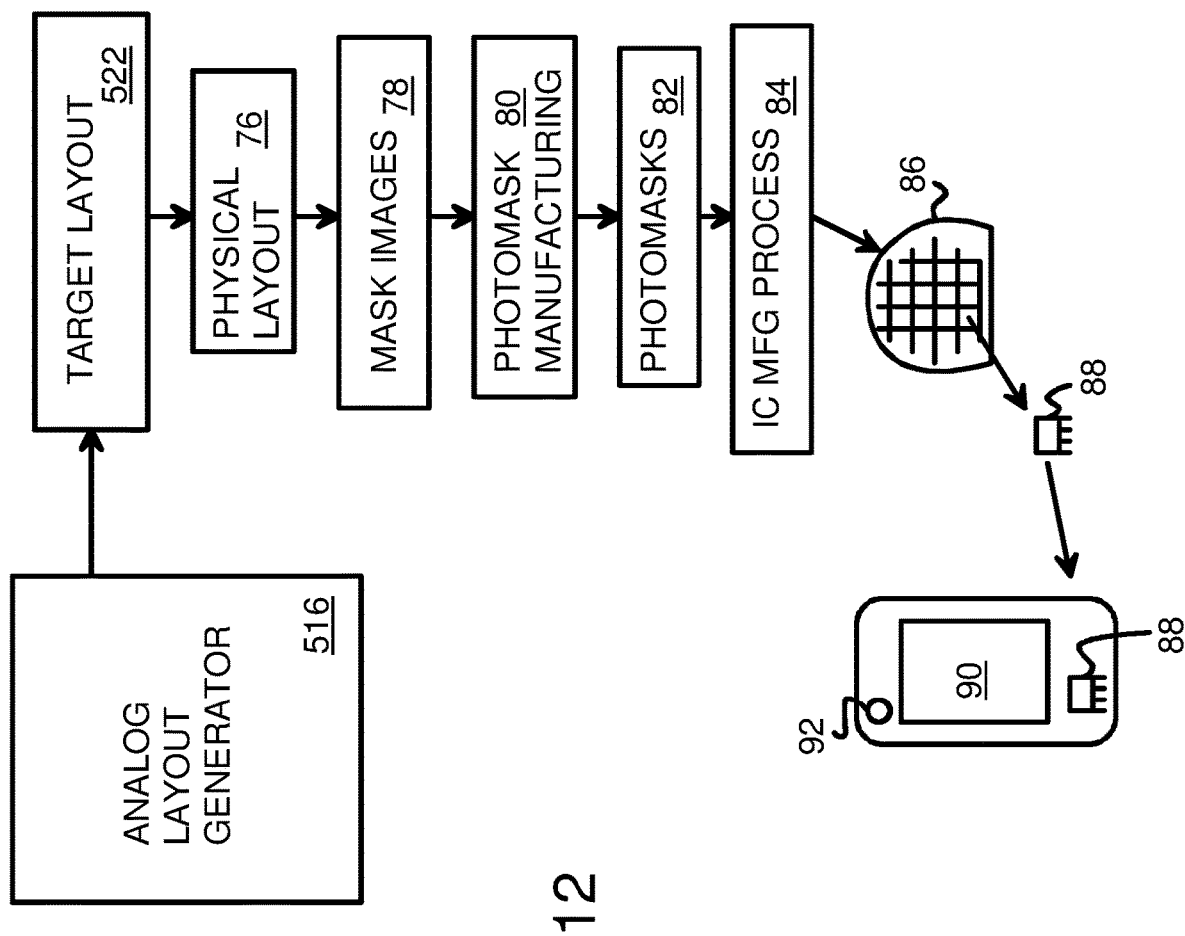
FIG. 12 shows the use of a target layout file generated by the analog layout generator from the reusable layout database to control manufacture of an IC by writing photomasks.

FIG. 12 shows the use of a target layout file generated by the analog layout generator from the reusable layout database to control manufacture of an IC by writing photomasks. Analog layout generator 516 generates target layout file 522 from reusable layout database 514 by processing reusable commands from analog layout design toolkit 510 that are inserted into reusable layout database 514 by a layout engineer. Target layout file 522 is in GDSII format or is converted to GDSII format for use as physical layout 76 by the photomask-making vendor.

Physical layout 76 specifies physical x, y locations on each die where various components will be located on the finished Integrated Circuit (IC) die. Physical layout 76 is converted to many layers of images that specify where gates are located, locations of metal wires, vias, and contacts between layers, and locations of oxides and diffusion areas on the substrate. Mask images 78 typically include one image for each patterned layer.

A mask-making machine reads mask images 78 or another design file and physically writes or burns these images onto photomasks 82. Photomasks 82 are a tangible product that is produced as a result of the layout migration software or routines that generates target layout file 522, which is eventually converted to mask images 78 of the actual transistor gates and wiring by software. While the layout migration software can be executed on a generic computer, creating photomasks 82 requires the use of specialized machines that write the layout data onto individual masks, such as by a light or an electron beam that is switched on and off by the layout data while being scanned in a rasterized pattern over a layer of unexposed photo-resist polymers that is placed over a blank photomask glass plate. The photo-resist is exposed in certain locations by the light or electron beam and unexposed in other regions. The exposed plates may then be washed in a chemical developer bath to remove either the exposed or the unexposed regions to create photomasks 82.

Multiple plates of photomasks 82, one for each semiconductor process layer, are generated by the photomask machine during photomask manufacturing 80. The plates of photomasks 82 are then sent to the semiconductor factory (fab or foundry) and loaded into photo-masking machines, where light passing through photomasks 82 exposes photo-resist resins on semiconductor wafers during IC manufacturing process 84. After processing through many layers of exposure by photomasks 82, and other processing such as ion implantation, diffusion, oxide growth, polysilicon and metal deposition, via and contact etching, and metal and poly etching, wafer 86 is produced by IC manufacturing process 84. Wafer 86 is a silicon, Gailum-Arsinide, or other semiconductor substrate with patterned layers formed on its surface. Many chips are produced on each wafer 86. After initial wafer-sort testing, wafer 86 is sawed into dice that are placed into packages to produce IC 88.

Thus target layout file 522, generated from reusable layout database 514, controls a series of steps in the manufacturing processes that eventually result in photomasks 82 and IC 88. Very specialized machinery and computers that control these machines are themselves ultimately controlled or directed by the data in target layout file 522 to cause a specific IC 88 chip to be produced.

IC 88 can be an ASIC or module that is fitted into an end-user device such as smart phone 90. Smart phone 90 may include camera 92 that captures images that are processed on smart phone 90 using IC 88. IC 88 can be manufactured by two or more foundries and implement the existing design, but using two different sets of design rules. Each set of design rules creates a different target layout file 522 that generates a different set of photomasks 82 for the particular semiconductor process that fabricates IC 88.

Alternate Embodiments

Several other embodiments are contemplated by the inventors. For example, absolute coordinates in the original layout can be adjusted or scaled. For example, absolute x,y locations in original layout 190 (FIG. 8A) could be scaled by 0.5 to x/2,y/2 to generate the corresponding absolute locations in first target layout 194 (FIG. 8B). The original floorplan may be used, but scaled to the new design rules. The path width, contact via area, etc. can be changed to generate a scaled single device.

The lowest-level cells in the hierarchy could be manually edited by the layout engineer to include parameters from the design rules, such as spacings and widths. Design rules can be stored in an isolated file that can be loaded by analog layout design toolkit 510. Layout engineers can directly change the values in the design rule file. A graphic interface could also be developed for users to input such parameters. Such changes to the design rules cause analog layout generator 516 to automatically adjust the converted layouts output by analog layout generator 516, since reusable layout database 514 is relative to parameterized design rules. For example, if only the design rule of contact via area is changed, all the contacts will be changed in the target layout, without changing the relative position to diffusion spacing.

Some sets of design rules may include special rules, such as enlarged sizes and spacings for high-voltage transistors. Special layouts may be used such as doughnut or ring-shaped transistor gates. Guard rings or other structures may be added to cells that are tagged for high voltage or other special use. The reusable code may include functions to activate these special layouts and design rules for certain cells. Transistors for analog operation may have different layout requirements than transistors used in digital circuits, even if on the same IC.

The reusable code entered into reusable layout database 514 by the layout engineer has been described as being processed by both analog layout generator 516 and device generator 518, with array functions processed by device generator 518 and other functions processed by analog layout generator 516, the partitioning of functions could be adjusted so that either device generator 518 or analog layout generator 516 processes all functions from analog layout design toolkit 510. Device generator 518 and analog layout generator 516 could also be combined.

While syntax for the reusable code has been shown in FIG. 5B and FIG. 11, many modifications to the syntax and parameters used could be substituted. The code shown is just one example of a possible code syntax. Likewise, layout parser 504 could create layout database file 506 using a different syntax than shown in FIG. 3. Extensions could be supported for P-cells and other structures.

The over-writes of layout database file 506 by the layout engineer do not have to be 1:1. One line in layout database file 506 could be replaced by multiple lines of reusable code from the layout engineer in reusable layout database 514, or multiple lines in layout database file 506 could be replaced by a single line of reusable code from the layout engineer in reusable layout database 514. Some line could be 1:1, and others 1:N or N:1, depending on the functions and layout.

This invention benefits an analog layout design much more than a digital layout design. For a digital circuit layout, layout engineers do not need to design blocks by themselves. The foundry will provide a standard cell library as basic gate-level modules from which to compose the layout. Moreover, since the digital circuit performance is not sensitive to placement and routing, there are mature CAD tools to perform automatic placement and routing. However, for analog circuit layout designs, engineers usually do not have foundry-supplied standard cells to use, so the layout engineers expend greater effort than for a digital layout design. Moreover, compared to digital circuits, analog circuit performance is much more sensitive to the layout floorplan, so analog layouts require a large amount of the designer's expertise to handle unexpected effects. Such unexpected effects include asymmetry induced signal mismatch, large parasitic capacitances and resistances. Therefore, analog layout design can benefit more from this invention rather than digital layout design.

The layout engineer or other engineers or programmers could write search-and-replace routines or other macros to search layout database file 506 for certain data items, and re-write these data items with reusable code, rather than manually over-write each data item with reusable code. For example, layout database file 506 could be searched for interconnect between cells, and these interconnect replaced with a routing function from routing functions 134, allowing analog layout generator 516 to re-route the layout rather than use existing interconnect.

A graphical user interface could be developed to present analog layout design toolkit 510 to the layout engineer, allowing the layout engineer to select data items in layout database file 506 and then paste in reusable code to generate reusable layout database 514. The existing layout could be graphically displayed to the layout engineer for reference, and possibly allow the engineer to select x,y coordinates of objects on the displayed layout for pasting into the reusable code.

Other programs may be used for further processing, such as a design rule checker or a schematic verifier. These programs may flag errors for the layout engineer to manually fix, or may alter the layout database file to fix the errors.

Many variations of IC semiconductor manufacturing processes are possible. Photomasks 82 may be made with a variety of specialty machines and processes, including direct writing to burn off a metalized layer rather than a photoresist. Many combinations of diffusions, oxide growth, etching, deposition, ion implant, and other manufacturing steps may have their resulting patterns created on the IC controlled by photomasks 82.

Analog layout generator 516, analog layout design toolkit 510, device generator 518, and other components may be implemented in a variety of technologies, using various combinations of software, hardware, firmware, routines, modules, functions, etc. Many partitionings of modules, blocks, components, routines, subroutines, processes, functions, etc. are possible and may be substituted. Many variations to the syntax of the reusable code, functions, and files are possible. Many file formats and variations may be used. Some embodiments may not use all components. Additional components may be added.

The layout parser can also parse a local copy of GDSII file 502 for cell definitions or cell delimiters that define the contents of a cell, and the cell definition can include boundaries of polygons, paths, text, and instances of other cells. Cell definitions can be used to create customized Pcells by the layout engineer. Instances can call a foundry-provided Pcell or a customized Pcell. SREF is an intrinsic element in the GDSII stream format that describes the position of one structure in reference to another structure.

Terms such as up, down, left, right, above, below, etc., are relative and depend on the viewer's location or viewpoint. The floorplan, layout, cells, and data items can be rotated, flipped, mirrored, and otherwise transformed. Many variations are possible.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A computer-implemented method for migrating an existing layout of an Integrated Circuit (IC) to a target layout of the IC comprising:

receiving an existing layout file specifying the existing layout;

parsing the existing layout file for data items that include boundaries of polygons, paths, and instances of cells, wherein a cell contains one or more boundary, path, or instance of another cell;

writing the data items into a layout database file in a text-based format;

displaying data items in the text-base format to a layout engineer, and receiving from the layout engineer updated lines of reusable code;

replacing some data items in the layout database file with the updated lines of reusable code to generate a reusable layout database, wherein the reusable code specifies reusable data items;

compiling the reusable layout database and using a first set of target design rules to adjust sizes and spacings of layouts of the reusable data items in the reusable layout database to meet the first set of target design rules to generate a first target layout file; and compiling the reusable layout database and using a second set of target design rules to adjust sizes and spacings of layouts of the reusable data items in the reusable layout database to meet the second set of target design rules to generate a second target layout file;

wherein a second target layout specified by the second target layout file violates the first set of target design rules but does not violate the second set of target design rules;

wherein the reusable layout database is reused for generating the first target layout file and for generating the second target layout file.

2. The computer-implemented method of claim 1 further comprising:

shrinking sizes and spacings of data items in the reusable layout database by a first scaling factor to generate scaled data items in the first target layout file;

wherein the first scaling factor is a ratio of corresponding design rules in the first set of target design rules and in an existing set of design rules for the existing layout;

wherein the first scaling factor includes a block scaling factor for scaling cells and a spacing scaling factor for scaling spacing between cells.

3. The computer-implemented method of claim 1 wherein the existing layout file is in a binary format;

wherein the layout database file is in a text format that is readable and editable by the layout engineer.

4. The computer-implemented method of claim 3 further comprising:

providing a layout design toolkit to the layout engineer, the layout engineer selecting functions from the layout design toolkit and including functions selected in the updated lines of reusable code;

wherein the reusable code includes functions from the layout design toolkit.

5. The computer-implemented method of claim 4 further comprising:

receiving function selections from the layout engineer for inclusion in the reusable code, the function selections including placement functions that specify relative placement of the reusable data items relative to locations of other data items, and routing functions that specify routing methods for interconnecting cells by generating metal interconnect lines.

6. The computer-implemented method of claim 3 further comprising:

generating an array of cells from reusable code in the reusable layout database using a device generator.

7. The computer-implemented method of claim 3 further comprising:

wherein when the reusable code includes a CommonSD function, a layout generator generates a layout of a pair of transistors sharing a source/drain region between the pair of transistors specified in the first target layout file.

8. The computer-implemented method of claim 3 wherein the existing layout file is in a Graphics Design System 2 (GDSII) format;

further comprising:

converting the first target layout file to the GDSII format.

9. The computer-implemented method of claim 3 further comprising:

using the first target layout file to control generation of photomasks for use in manufacturing the IC at a first foundry that uses the first set of target design rules;

using the second target layout file to control generation of photomasks for use in manufacturing the IC at a second foundry that uses the second set of target design rules.

10. A layout migration system comprising:

an input for receiving an existing layout file for a first layout of an Integrated Circuit (IC) for a first process using a first set of design rules;

a layout parser executing on a processor for parsing the existing layout file to identify data items, the data items comprising boundaries of polygons, cell instances, and cell definitions, wherein the cell definitions comprise boundaries of polygons and other cell instances;

a layout data-item integrator executing on a processor that generates a layout database file stored in a memory, the layout database file comprising the data items identified by the layout parser from the existing layout file;

a layout design toolkit having placement functions that specify placement locations of data items relative to locations of other data items, the placement locations being a function of a set of design rules;

an expertise input for receiving reusable code that contains the placement functions;

a layout expertise integrator executing on a processor that places the reusable code into the layout database file to generate a reusable layout database, wherein the reusable layout database has the reusable code and some of the data items from the layout database file, wherein other data items from the layout database file are replaced by the reusable code; and a layout generator executing on a processor that compiles the reusable layout database and converts the data items to data item layouts with sizes and spacings that comply with a second set of design rules, and that compiles the reusable code and places data items in second relative locations in response to the placement functions in the reusable code, the second relative locations also complying with the second set of design rules, to generate a second layout file for a second layout of the IC for a second process using the second set of design rules.

11. The layout migration system of claim 10 wherein the layout generator also compiling the reusable layout database and converting the data items to data item layouts with sizes and spacings that comply with a third set of design rules, and compiling the reusable code and placing data items in third relative locations in response to the placement functions in the reusable code, the third relative locations also complying with the third set of design rules, to generate a third layout file for a third layout of the IC for a third process using the third set of design rules.

12. The layout migration system of claim 11 further comprising:

a device generator for generating an array of cells in response to reusable code that includes an array function, the device generator sending the array of cells to the layout generator for further processing.

13. The layout migration system of claim 11 wherein the layout database file is in a text format;

wherein the reusable layout database is a text file;

wherein the reusable code is in the text format that can be typed into a keyboard by a layout engineer and sent to the expertise input.

14. The layout migration system of claim 13 wherein the layout design toolkit further comprises position functions and routing functions;
   wherein the position functions report x,y positions of data items to the layout engineer;
   wherein the routing functions specify a routing method using by the layout generator for generating layouts of interconnect metal in the second layout file and in the third layout file, the interconnect metal for connecting cells.

15. The layout migration system of claim 14 wherein the placement functions further comprises a commonSD function that specifies that a transistor cell shares a common source/drain region with a referenced transistor cell that is referenced by the CommonSD function;
   wherein the placement functions further comprises a common center function that specifies that a data item shares a common center with a referenced data item that is referenced by the common center function;
   wherein the routing functions further comprises a rectangle function that generates a rectangle in a metal layer to interconnect two data items referenced by the rectangle function;
   wherein the routing functions further comprises a Z-shaped function that generates a Z-shaped polygon in a metal layer to interconnect two data items referenced by the Z-shaped function.

16. The layout migration system of claim 11 further comprising:
   a format converter for generating the second layout file in a binary stream format for use by a photomask manufacturer that makes photomasks for a semiconductor foundry using the second process;
   the format converter further for generating the third layout file in a binary stream format for use by an alternate photomask manufacturer that makes photomasks for an alternate semiconductor foundry using the third process,
   wherein the first layout of the IC is migrated to the second layout file for manufacture by the semiconductor foundry using the second process, and to the third layout file for manufacture by the alternate semiconductor foundry using the third process.

17. A non-transitory computer-readable medium for storing computer-executable instructions, the computer-executable instructions when executed by a processor implementing a method comprising:
   receiving an existing layout file specifying an existing layout;
   parsing the existing layout file for data items that include boundaries of polygons, paths, and instances of cells, wherein a cell contains one or more boundary, path, or instance of another cell;
   writing the data items into a layout database file;
   receiving updated lines of reusable code;
   replacing some data items in the layout database file with the updated lines of reusable code to generate a reusable layout database, wherein the reusable code specifies reusable data items;
   compiling the reusable layout database and using a first set of target design rules to adjust sizes and spacings of layouts of the reusable data items in the reusable layout database to meet the first set of target design rules to generate a first target layout file; and
   compiling the reusable layout database and using a second set of target design rules to adjust sizes and spacings of layouts of the reusable data items in the reusable layout database to meet the second set of target design rules to generate a second target layout file;
   wherein a second layout specified by the second target layout file violates the first set of target design rules but does not violate the second set of target design rules;
   wherein the reusable layout database is reused for generating the first target layout file and for generating the second target layout file.

18. The non-transitory computer-readable medium of claim 17 wherein the method further comprises:
   shrinking sizes and spacings of data items in the reusable layout database by a first scaling factor to generate scaled data items in the first target layout file;
   wherein the first scaling factor is a ratio of corresponding design rules in the first set of target design rules and in an existing set of design rules for the existing layout;
   wherein the first scaling factor includes a block scaling factor for scaling cells and a spacing scaling factor for scaling spacing between cells.

19. The non-transitory computer-readable medium of claim 18 wherein the method further comprises:
   providing a layout design toolkit to a layout engineer, the layout engineer selecting functions from the layout design toolkit and including the functions selected in the updated lines of reusable code;
   wherein the layout database file is in a text-based format;
   writing the data items into the layout database file in the text-based format;
   displaying data items in the text-base format to the layout engineer, and receiving from the layout engineer updated lines of reusable code;
   receiving function selections from the layout engineer for inclusion in the reusable code, the function selections including placement functions that specify relative placement of the reusable data items relative to locations of other data items, and routing functions that specify routing methods for interconnecting cells by generating metal interconnect lines.

20. The non-transitory computer-readable medium of claim 18 wherein the method further comprises:
   generating an array of cells from reusable code in the reusable layout database using a device generator.

\* \* \* \* \*